(No Model.) 2 Sheets—Sheet 1.
W. H. PACK.
CARTRIDGE LOADING BLOCK.
No. 394,288. Patented Dec. 11, 1888.
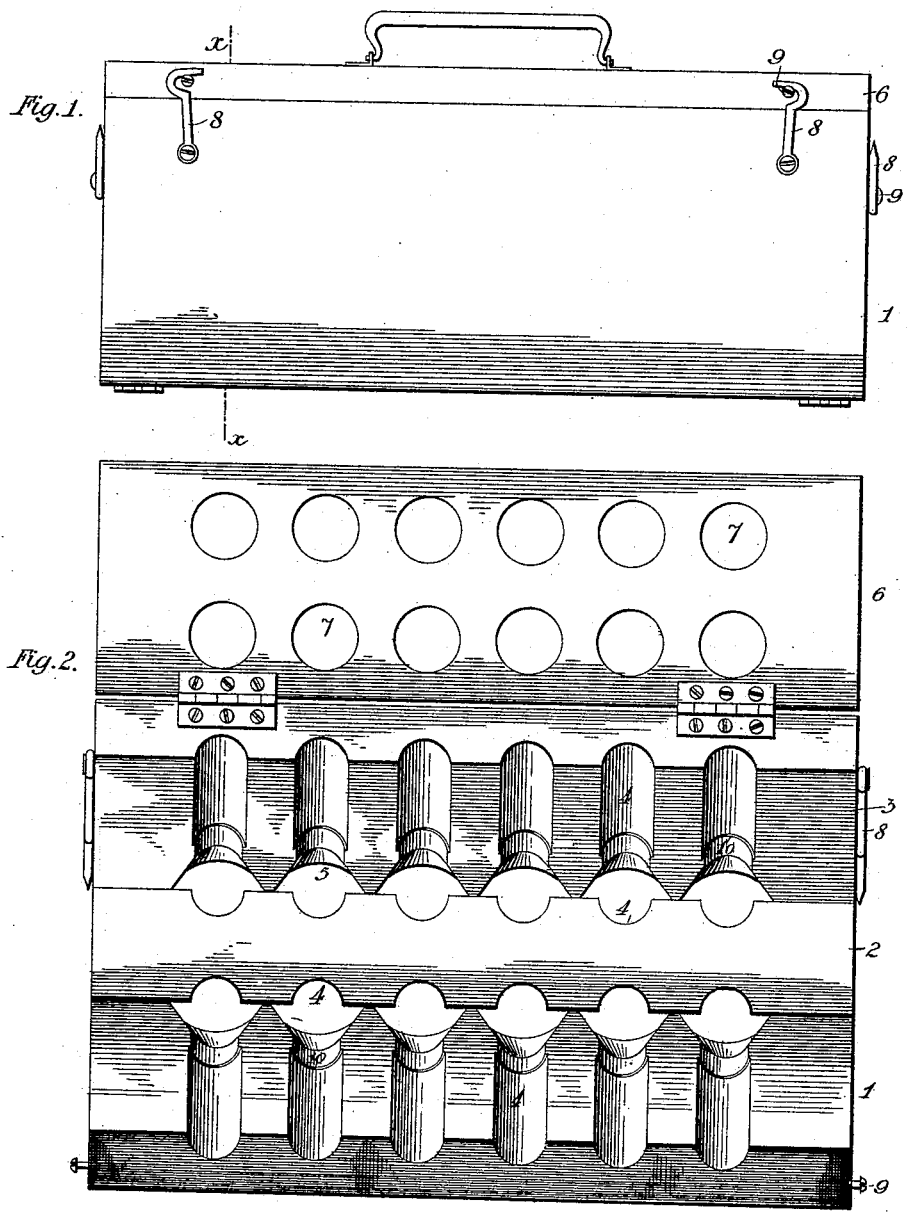

(No Model.) 2 Sheets—Sheet 2.

W. H. PACK.
CARTRIDGE LOADING BLOCK.

No. 394,288. Patented Dec. 11, 1888.

Witnesses.
Will T. Norton
Geo. G. Penney

Inventor.
William H. Pack.
By his Attorneys
John J. Halsted & Son

UNITED STATES PATENT OFFICE.

WILLIAM H. PACK, OF PHILADELPHIA, PENNSYLVANIA.

CARTRIDGE-LOADING BLOCK.

SPECIFICATION forming part of Letters Patent No. 394,288, dated December 11, 1888.

Application filed September 15, 1888. Serial No. 285,471. (No model.)

*To all whom it may concern:*

Be it known that I, WILLIAM H. PACK, of Philadelphia, in the county of Philadelphia and State of Pennsylvania, have invented certain new and useful Improvements in Cartridge-Loading Blocks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The objects of my invention are the loading of shells with accuracy and with uniformity of caliber and charge, and to insure quickness in loading.

Loading-blocks as heretofore made are, so far as I am aware, made with holes or cavities for the shell drilled or bored in the solid block, and therefore incapable of opening laterally away from the cartridge after the same has been filled or rammed full. The consequence is that the empty shells, in order to be conveniently and rapidly placed in these holes for the purpose of being filled, must be enough smaller than the holes to enable them to be placed lengthwise therein; but the act of filling them closely and compactly tends to expand or stretch them, and they therefore spread or enlarge out laterally proportionate to the amount of force used, and are necessarily made tighter and tighter in these holes, making it difficult to get them out, and there also is risk of damaging them in this lateral strain, due to such spreading, and a further risk of damage in forcing them out after being filled.

Another bad effect resulting from the above-stated existing means and method of filling or loading is that in any considerable number of filled shells their diameters vary, so that it is difficult to get some of them into the gun; with others it is quite impossible, and others are too loose.

My invention is intended to avoid these difficulties and to prevent these bad results; and it consists in a novel construction of block having, besides other special features, vertical divisions directly through the diameters of the block, all which will clearly appear from the following.

Figure 3:
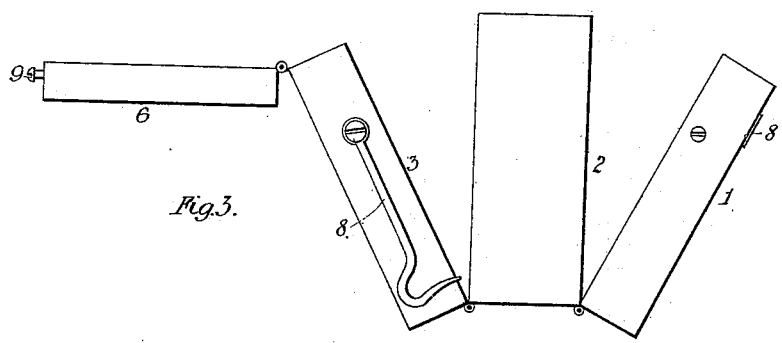
Figure 4:
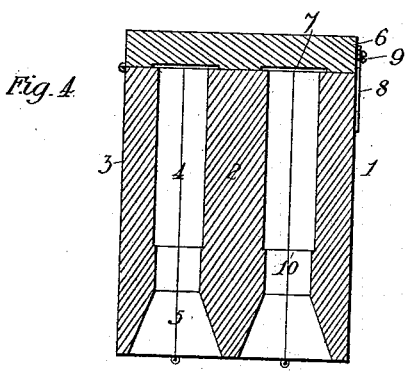

Figure 1 of the drawings represents an elevation of my improved loading-block closed; Fig. 2, a view of the block open; Fig. 3, an end view of Fig. 2; Fig. 4, a section through line *x x*, Fig. 1.

The block is made in a series of vertical sections of any desired number or of any suitable material—as wood, metal, &c.—such as shown at 1 2 3, the line of separation between each two adjacent parts or sections being directly through the axial line of the tubular holes 4, as shown. Each hole at its filling end is made funnel-shaped, as shown at 5, each half of the funnel being continuous with the tube and made in the same section. The sections are all closely hinged together on that side of the complete block in which the funnels are made; and it will be seen that therefore each funnel as well as each hole is centrally bisected lengthwise, so that neither portion 1 2 3, &c., has any complete hole or funnel in it, but only half holes or funnels. The sections are also provided with hooks and eyes or other suitable locking device for holding them tightly together when in use.

The side of the block opposite the funnel side has a hinged flap or cover, 6, adapted, when the hinged sections 1 2 3, &c., are closed up tightly to each other, to fit snugly over the ends of the holes, and consequently over the heads of the shells which may be inserted in them. The under side of this lid has a series of shallow circular depressions, 7, severally adapted to receive the heads of the shells, and the lid is a strong one and arranged to be held down tightly against these heads and against the block by means of hooks 8 and staples 9, or any other well-known or suitable fastening device. It will now be seen that no shells need be forced into a tube endwise when empty or forced out endwise after being filled, and therefore that when laid down in the semicircular troughs or beds 10 of any of the sections there is no strain on them, and consequently they may be made in the first instance large enough to fit such bed tightly, thus precluding the liability of subsequent expansion in the act of being filled. When half of these beds are thus supplied with such tightly-fitting empty shells, the sections are closed up upon each other and upon the shells, the lid closed over the heads of the shells and securely fastened, and everything is then ready for loading the shells from the funnel side.

After the shells are filled and ready for removal, they are all set free at once by merely unlocking the parts and spreading the sections apart on their hinges and then lifting the cartridges from their beds in a simple easy way without effort and without strain on the cartridge and without any appreciable or damaging resistance. The result is a better lot of cartridges and all uniform in diameter, and all capable of use in a gun of the same bore.

The bisected holes 4 have a shoulder, 10, caused by making that part of the hole just beneath the funnel portion a little smaller than the other portion of the hole. This shoulder prevents the open end of the shell from interfering with the loading, as it would be impossible to load the shell if the hole were all the way up of a uniform size, for the wad would not then go down, but would turn up the end of the shell.

The split or divided funnel being made in the same block with and constituting a continuous unbroken part of the filling-hole is a very valuable and novel feature.

With ordinary separate or removable funnels the filling operations require time and skill in putting in the wads to prevent their going down edgewise.

I claim—

1. A cartridge-shell-loading block made in grooved sections hinged together, the grooves of which are longitudinal divisions of the holes for receiving the shells, such holes at their filling ends terminating in a funnel-shaped mouth.

2. A composite shell-loading block made in several sections, each having a series of semi-circular grooves terminating in a half-funnel, the sections being hinged together at the funneled side of the block and at the opposite side provided with a single hinged cover for all the sections, and with fastening devices serving to lock tightly together the series of sections and the cover.

WILLIAM H. PACK.

Witnesses:
H. E. GARSED,
CHAS. DUFREE.